April 15, 1941.  D. W. MUELLER  2,238,800
APPARATUS FOR AND METHOD OF HOMOGENIZING MOLTEN
GLASS IN FOREHEARTHS OR LIKE STRUCTURES
Filed Jan. 26, 1939  2 Sheets-Sheet 2
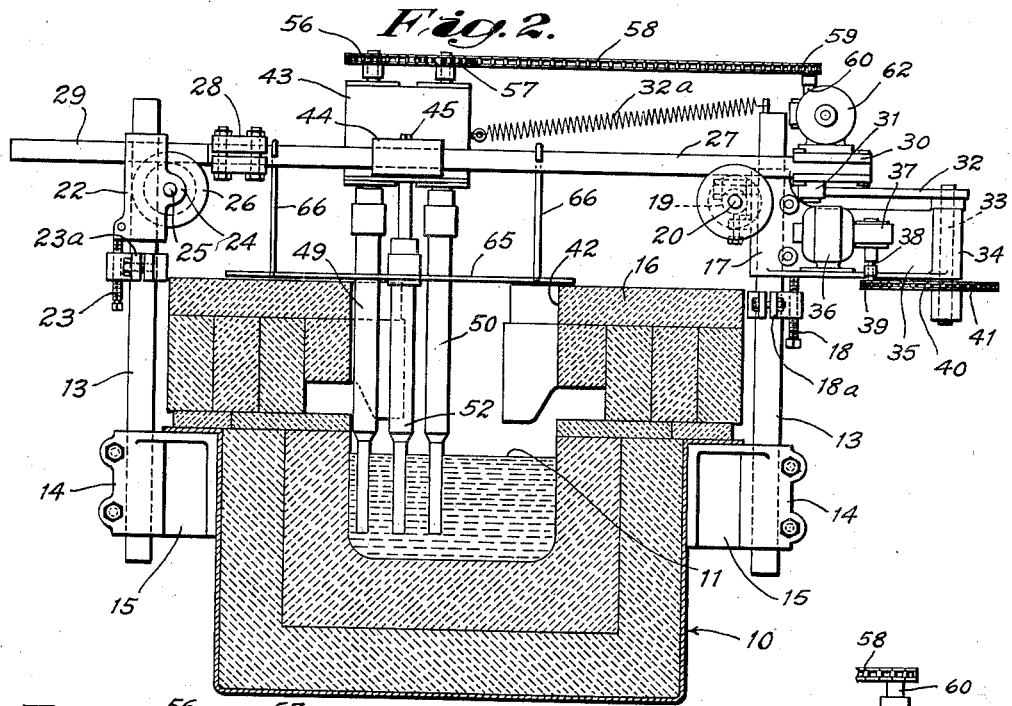
Inventor
Donald W. Mueller
by Brown & Parham
Attorneys
Witness
W. B. Thayer.

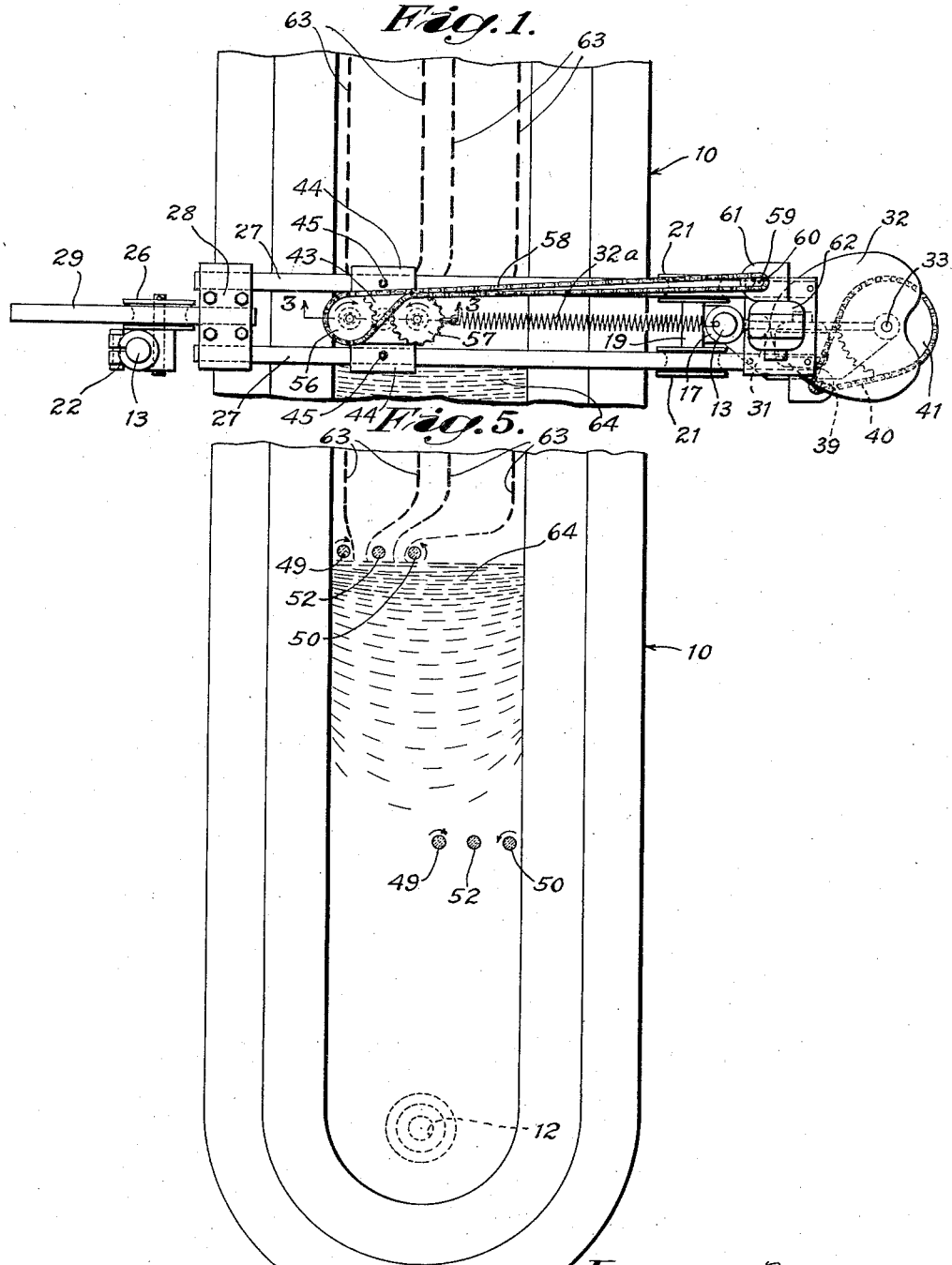

Patented Apr. 15, 1941

2,238,800

UNITED STATES PATENT OFFICE 2,238,800

APPARATUS FOR AND METHOD OF HOMO-GENIZING MOLTEN GLASS IN FORE-HEARTHS OR LIKE STRUCTURES

Donald W. Mueller, West Hartford, Conn., assignor to Hartford-Empire Company, Hartford, Conn., a corporation of Delaware Application January 26, 1939, Serial No. 252,864

15 Claims. (Cl. 49—54)

This invention relates to improvements in means for and methods of acting on molten glass in forehearths or other molten glass flow structures in an attempt to render the glass therein more nearly uniform in temperature and homogeneous.

It is usual to feed or otherwise remove molten glass from the outer end portion of a forehearth having a channel to and through which molten glass flows from the refining end of a melting tank which constitutes the source of supply of such glass. The glass produced in the melting tank comprises component materials of different melting temperatures and different specific gravities. Because of this and other causes, including the low heat conductivity of glass, its different viscosities when at different temperatures and when of different compositions, its susceptibility to contamination by clay that has been eroded and washed from the walls of the forehearth, the complete stream or body of glass in the forehearth at any time actually may comprise a plurality of longitudinal portions or component streams and other portions of different temperatures and viscosities, and sometimes of compositions, which may fail to unite into or form a thermally uniform homogeneous whole. The hotter and less viscous of these portions tend to flow more rapidly than the cooler, more viscous ones. The glass in the forehearth channel may include longitudinal streaks of contaminated glass or thin streams of glass of compositions different from the adjacent glass, constituting "cords" or striae which will cause defects in or impair the quality of the articles which are formed of charges fed from or glass otherwise removed from the outer end portion of the forehearth.

An object of the present invention is to provide a novel apparatus for and a novel method of acting on the glass in a forehearth channel or like structure so as to be more effective than any prior apparatus or method known to me in rendering such glass more clearly uniform in temperature and homogeneous.

A further object of the present invention is to provide an apparatus for and a method of acting on the glass of the forehearth channel or like structure which will more effectively eliminate or minimize cords or longitudinal striae in the glass in the forehearth than has been possible by the use of any prior known apparatus or method.

According to the present invention, I provide a plurality of laterally spaced cooperative homogenizing implements which depend into the glass in the forehearth channel to the desired depth and are reciprocated as a unit or bank transversely of the glass in the forehearth channel while acting on the glass approaching them from the up-stream side and moving past them to greatly attenuate and reduce in cross section any cords or streaks of contaminated glass or glass of different compositions in the general stream or body of glass in the forehearth. This bank of implements, by its reciprocatory movements transversely of the forehearth and by the cooperative action of the implements on the glass throughout such reciprocatory movements, effects thorough transverse mixing or blending of the different portions of glass of a transverse section of the whole stream or body of glass in the forehearth and causes the attenuated cords or striae to be disposed in transversely extending lines or courses in the glass at the downstream side of the path of such implements.

More particularly described, apparatus for carrying out the present invention may comprise laterally spaced vertical homogenizing members movable in a bank back and forth across a forehearth channel, these homogenizing members cooperating to draw the glass from the up-stream side thereof through spaces between adjacent homogenizing members which are operated to have a "wringer-like" or "squeezing" action which will be effective to attenuate or reduce in cross-section any cords, streaks or contaminated glass or striae in the glass acted on and at the same time to lay the attenuated cords, streaks of contaminated glass or striae back and forth in and transversely of the body of glass at the downstream side of the bank of homogenizing members.

Other objects and advantages of the invention will hereinafter be pointed out or will become apparent from the following description of a practical embodiment thereof, as shown in the accompanying drawings, in which Fig. 1 is a plan view of a fragmentary portion of a forehearth channel equipped with homogenizing apparatus of the present invention, the cover structure of the forehearth being omitted for simplicity and clearness of illustration.

Fig. 2 is a transverse vertical section through the forehearth, with the novel glass homogenizing apparatus shown in elevation, Fig. 3 is a relatively enlarged sectional detail view substantially along the line 3—3 of Fig. 1, Fig. 4 is an elevation of the novel homogenizing apparatus as viewed from the right-hand side of Fig. 2, the forehearth structure being omitted, and Fig. 5 is a diagrammatic view of a forehearth channel, illustrating the manner of utilizing two banks of homogenizing members of the present invention at places spaced longitudinally of the forehearth channel, the homogenizing members of each bank being shown only in section.

In Figs. 1, 2 and 5, a forehearth channel is designated 10. This channel may be of any suitable known construction, adapted to be connected in any suitable known manner with a glass melting tank (not shown) so that a body or stream of glass, such as indicated at 11 in Fig. 2, will continuously fill the channel of the forehearth, including the delivery or outer end portion thereof, to a predetermined desirable depth. In Fig. 5, the delivery or outer end portion of the forehearth, which might be a separate chamber, is shown as being provided with an outlet, indicated at 12, in its bottom through which glass may be fed under the control of any suitable known feeding means (not shown). It is to be understood that glass may be removed from the delivery or outer end portion of the forehearth channel or delivery chamber in any suitable known way and by the use of any suitable known glass removing apparatus or instrumentality.

One form of glass homogenizing apparatus of the present invention may comprise a supporting structure which includes a pair of standards or vertical posts 13. These are located at opposite sides of the forehearth at a predetermined desirable distance from the place at which glass is to be removed from the delivery chamber or the outer end portion of the forehearth and may be supported and maintained in position by clamps 14 carried by brackets 15 on the casing for the forehearth channel.

The standards 13 extend above the level of the cover structure 16 of the forehearth. A sleeve 17 is slidably mounted on the upper portion of the right hand standard 13, as viewed in Fig. 2, being supported in vertically adjusted position on such standard by an adjusting screw 18. The screw 18 may be carried by a vertically adjustable clamp 18a on the standard. The sleeve 17 at its side next to the forehearth, carries a suitable bearing structure 19 for an axle 20, the opposite end portions of which carry peripherally grooved wheels or rollers 21. The other standard 13 also is provided with a vertically adjustable sleeve, indicated at 22, on the upper end portion. This sleeve 22 is supported in vertically adjusted position on the standard by an adjusting screw 23. The screw 23 is carried by a vertically adjustable clamp 23—a on the standard. The sleeve 22, like sleeve 17, is provided at its side next to the forehearth with a bearing structure 24 in which is mounted an axle 25 that carries a peripherally grooved wheel or roller 26. The wheels or rollers 26 and 21 movably support a carriage that is reciprocable transversely of the forehearth.

As shown, this carriage comprises a pair of spaced rounded bars or rods 27 resting on the grooved peripheries of the wheels 21, a crosshead at the ends of the members 27 nearest to the wheel 26, and a rounded bar or rod 29 extending from the middle of the cross-head 28 so as to be supported upon the grooved periphery of the wheel 26.

The bars 27 are connected at their right-hand ends, as viewed in Figs. 1 and 2 by a cross connecting structure or head 30. The cross head 30 carries a depending roller 31 which engages the periphery of a cam 32 which rotates about a stationary axis. The carriage thus may be reciprocated back and forth across the forehearth, being moved to the left by the cam 32 and to the right by a spring 32—a which connects an appropriate part of the carriage with the right-hand standard 13.

As shown, the cam 32 is carried by a vertical shaft 33 which is journaled in a bearing 34 on a bracket 35 on the sleeve 17. This bracket also carries a motor 36 operating through a reduction gear unit 37 to drive a short shaft 38. The shaft 38 carries a drive sprocket 39 connected by a chain 40 wtih a sprocket 41 on the lower end portion of the cam shaft 33. The contour of the cam 32 may be as shown in Fig. 1 so as to reciprocate the carriage transversely of the forehearth with each stroke similar to the reverse stroke and at a substantially uniform speed throughout each such stroke or the contour of the cam may be selected to produce strokes of the carriage of any predetermined desirable character or characters.

The carriage referred to supports the homogenizing implements in position to depend through a suitable opening in the cover structure, such as that indicated at 42, Fig. 2, into the body or stream of glass in the forehearth channel. As shown, these implements are supported from the carriage by a head 43 which is in the form of a journal box (see Fig. 3). This journal box has a pair of lateral sleeve portions 44 slidable on the bars 27 of the carriage and secured thereto in adjusted position along such bars, as by the set screws 45, Fig. 1.

The head 43 is provided with upper and lower vertically aligned bearings 46 and 47 for antifrictionally supporting vertical shafts 48. Refractory implements 49 and 50 are detachably secured to the lower ends of the shafts 48, as by chucks or clamping devices 51. The implements 49 and 50 are spaced laterally of the forehearth channel a sufficient distance apart to accommodate a middle implement 52 which is secured at its upper end, as by a chuck or clamping device 53, to a vertical non-rotary supporting rod or stem 54. The stem 54 extends vertically through the central portion of the head 43 and may include a reduced upper end portion in threaded engagement with a nut 55 which rests on the top of the head 43 and thus supports the stem and its depending implement 52.

The upper end portions of the vertical shafts 48 may be provided with sprockets 56 and 57, respectively. A chain 58 extends around the sprocket 56 and one of the reaches thereof engages the sprocket 57. This chain also extends around a sprocket 59 at the upper end of a short driven shaft 60 of a reduction gear unit 61 which is operated by a motor 62 on the cross head 30. By this arrangement, the implement 49, which is nearest to the left-hand side wall of the forehearth channel, may be rotated in a clockwise direction or so that the up-stream side of the glass engaging portion of the implement 49 turns toward the stationary implement 52 while the implement 50 is being rotated in a counter-clockwise direction with its up-stream side also turning toward the stationary implement, (see Fig. 1).

The glass engaging portions of the implements preferably are of relatively small cross sectional areas as compared with stirring implements heretofore proposed for stirring glass in a forehearth channel of a given width. Although the cross sectional areas of these implements and the spacing of the several implements of the bank may be varied and good results still obtained, I prefer an arrangement such as shown in the drawings. According to this arrangement, the diameters of the glass engaging portions of the several implements are the same and the diameter of each such portion is sufficiently small that all three implements of the bank will be located at one side of the longitudinal median line of the forehearth channel when such bank of implements is at the end of a stroke toward either side wall of the forehearth. At this time, the glass engaging portion of the implement nearest such side wall preferably is located a distance of approximately half a diameter of the glass engaging portion thereof from the adjacent side wall and the glass engaging portion of the implement farthest from the same side wall is located at a like distance from the longitudinal median line of the forehearth channel. The non-rotary or stationary middle implement preferably is located equi-distant from the two rotating implements of the bank, the distance between the glass engaging portions of adjacent implements preferably being in the order of one-and-one-half times the diameter of each such portion.

The depth to which the implements will depend into the glass in the forehearth channel may be adjusted by vertical adjustment of the carriage which can be effected by the adjusting screws 18 and 23 and/or the vertically adjustable clamps which support these adjusting screws on the standards 13. The path of reciprocation of the implements transversely of the forehearth channel can be varied within limits by adjusting the head structure 43—44 longitudinally of the carriage bars 27.

During reciprocations of a bank of implements of the character hereinbefore particularly described, the two end implements of such bank may be rotated as indicated by the arrows in Fig. 1 and also in Fig. 5 at sufficient speeds to draw through the spaces between the implements of the bank glass from the oncoming body or stream of glass throughout substantially the entire cross-section thereof. Thus, at the instant that such a bank is at the limit of its stroke toward the left-hand wall of the forehearth channel, as shown in Fig. 1 and for the bank of implements farthest from the outlet 12 in Fig. 5, the oncoming glass is drawn toward such bank substantially as indicated by the lines 63 which diagrammatically represent streaks of contaminated glass or of glass of compositions different from the adjacent glass or other "cords" or striae in glass body or stream. The directions of movement toward the up-stream side of the spaces between the implements of such bank may be continuously changed, however, at a rapid rate as the bank of implements preferably is being reciprocated transversely of the glass in the forehearth as rapidly as is practicable without causing blisters, bubbles or seeds in the glass. This rate of reciprocation of the bank of implements may be in the order of ten times the maximum rate of longitudinal flow movement of the glass in the portion of the forehearth in which such bank is located although of course some of the advantages of the invention may be obtained if a slower rate of reciprocation of the bank of implements is employed.

The action of the bank of homogenizing implements on the glass is illustrated diagrammatically in Figs. 1 and 5. As shown in these views, any cords or striae, such as streaks of contaminated glass or of glass of compositions different from the adjacent glass, as indicated at 63, extend in the direction of length of the body or stream of glass in the forehearth and flow longitudinally therewith without being appreciably changed or reduced until they come within the zone of influence of the bank of homogenizing implements. Thereafter, they are attenuated or "drawn-out" and the rate of down-stream movements thereof are accelerated to substantial extents as they are pulled and diverted from their prior lines of flow movement toward and into the spaces between adjacent homogenizing implements, through which they are forced at relatively high velocity with the adjacent glass of the stream. This will cause further attenuation and "thinning-out" of the cords or striae, which is greatly increased by the reciprocatory movements of the bank of implements tranversely of the forehearth. As a consequence, a given portion of a cord or striae will have been drawn out or extended to many times its original length by the time it passes through the bank of homogenizing implements. At the down-stream side of the bank of implements, the already greatly attenuated or drawn-out cords and striae are further attenuated and extended by being laid in long, narrow loops which extend back and forth across the glass in the forehearth channel, somewhat as indicated at 64 in Figs. 1 and 5. The objective sought is to attenuate or "thin" such cords or striae as may be present in the glass in the forehearth to such an extent that they can be absorbed by or homogeneously blended with the uncontaminated or thermally and chemically more desirable glass passing to the outer or delivery end portion of the forehearth before glass containing any portions of such cords or striae is fed or otherwise removed from the forehearth. The operation of the bank of implements, as above described, tends to accomplish this objective and in any event greatly attenuates or "thins" any cords or striae acted on to such an extent as to greatly reduce the harmful effects thereof even if they should not be completely eliminated in any particular case. In addition, the different portions of glass which otherwise would remain in transversely different portions of the forehearth are thoroughly commingled and thus rendered substantially uniform thermally, physically and chemically—at least to the extent that they will combine chemically at their then thermal condition.

In the event that two of the banks of implements are employed, as shown in Fig. 5, the second bank of implements will act in a manner similar to that above described on any unabsorbed attenuated cords or striae and will further attenuate and reduce them for the purpose and with the result hereinbefore described. If two or more banks of homogenizing implements are employed, the like or concurrent reciprocatory strokes of adjacent banks transversely of the forehearth may be in opposite directions, the supporting and operating mechanism of each such bank being substantially as hereinbefore described. The locations of the several banks in the forehearth channel may be selected according to particular preference or service conditions for any given installation or set-up. If but one bank of implements is employed, the distance from the delivery point in the outer or delivery portion of the forehearth at which such bank is located likewise may be selected to give the most satisfactory results.

If desired, a heat confining baffle or cover plate 65 may be suspended by hooks 66 or other supporting means from the overhead carriage to move with a bank of implements above the opening 42 to reduce or control loss of heat or draft through such opening. One such baffle or cover plate is shown in Fig. 2.

A lesser or greater number of implements may be provided for commingling and homogenizing flowing glass in a forehearth or other channel. Relative rotary movement between adjacent implements of a bank, if a plurality of implements are employed, may be effected by any suitable known means and in any suitable or preferred way. Thus, all implements of a bank may be rotated about their respective axes, the directions of rotations of the several implements being as selected to meet particular requirements or preferences.

It is to be understood that the recitation herein of particular details of construction and operation of a preferred embodiment of the invention is not intended to restrict the invention to such details or beyond the scope indicated by the terms of the appended claims.

What I claim is:

1. Glass homogenizing apparatus for forehearths or like structures comprising an implement depending into the glass flow channel of such a structure for engaging molten glass of a supply stream in said channel, said implement being rotatable about its own axis and also laterally reciprocable, and means for rotating said implement about its own axis and for reciprocating it transversely of the flow channel.

2. Glass homogenizing apparatus for forehearths or like structures comprising a plurality of implements depending into the glass flow channel of such a structure for engaging molten glass of a supply stream in said channel, said implements being located in spaced relation transversely of a portion of the flow channel substantially less than the full width thereof, means for rotating at least one of said implements about its own axis, and means for reciprocating said implements as a unit transversely of the flow channel.

3. Glass homogenizing apparatus for forehearths or like structures comprising a bank of implements depending into the glass flow channel of such a structure for engaging molten glass of a supply stream in said channel, the respective implements of said bank being spaced apart in a direction extending transversely of the flow channel and occupying a portion of said channel substantially less than the full width thereof, means for effecting relative rotary movement between adjacent implements of said bank, and means for reciprocating said bank of implements transversely of the flow channel.

4. Glass homogenizing apparatus for forehearths or like structures comprising a bank of implements depending into the glass flow channel of such a structure for engaging molten glass of a supply stream in said channel, the respective implements of said bank being spaced apart in a direction extending transversely of the flow channel and occupying a portion of said channel substantially less than the full width thereof, means for effecting relative rotary movements between adjacent implements of said bank at a sufficient speed to exert a flow accelerating influence on the oncoming glass of the stream for a substantial distance up-stream from said bank of implements, and means for reciprocating said bank of implements transversely of the flow channel.

5. Glass homogenizing apparatus for forehearths or like structures comprising a bank of implements depending into the glass flow channel of such a structure for engaging molten glass of a supply stream in said channel, the respective implements of said bank being spaced apart in a direction extending transversely of the flow channel and occupying a portion of said channel substantially less than the full width thereof, means for effecting relative rotary movement between adjacent implements of said bank, means for adjusting the depth to which the implements of said bank depend in the flow channel, and means for reciprocating said bank of implements transversely of the flow channel.

6. Glass homogenizing apparatus for forehearths or like structures comprising a bank of implements depending into the glass flow channel of such a structure for engaging molten glass of a supply stream in said channel, the respective implements of said bank being spaced apart in a direction extending transversely of the flow channel and occupying a portion of said channel substantially less than the full width thereof, means for effecting relative rotary movements between adjacent implements of said bank, means for reciprocating said bank of implements transversely of the flow channel, and means for adjusting transversely of the flow channel the path of reciprocation of the bank of implements.

7. Glass homogenizing apparatus for forehearths or like structures comprising a carriage supported for movement transversely back and forth above such a structure channel, a plurality of implements depending from said carriage into the flow channel for engaging molten glass of a supply stream therein, the several implements of said bank being spaced apart in a line extending transversely of the flow channel, said bank of implements occupying only a portion of the full width of the flow channel, means for reciprocating said carriage and the implements depending therefrom transversely of the flow channel, and means for effecting relative rotary motion between adjacent implements of said bank.

8. Glass homogenizing apparatus for forehearths or like structures comprising a bank of implements depending into the glass flow channel of such a structure for engaging molten glass of a supply stream in said channel, said bank comprising three vertical implements arranged in spaced apart relation in a line extending transversely of the flow channel, said bank of implements occupying but a portion of the full width of the flow channel, means for rotating the end implements of said bank about their own axes in opposite directions such that the up-stream sides of the rotating implements turn toward the middle implement, and means for reciprocating said bank of implements transversely of the flow channel.

9. Glass homogenizing apparatus for forehearths or like structures comprising a bank of implements depending into the glass flow channel of such a structure for engaging molten glass of a supply stream in said channel, said bank comprising three vertical implements arranged in spaced apart relation in a line extending transversely of the flow channel, said bank of implements occupying but a portion of the full width of the flow channel, means for rotating the end implements of said bank about their own axes in opposite directions such that the upstream sides of the rotating implements turn toward the middle implement, the middle implement being non-rotary, and means for reciprocating said bank of implements transversely of the flow channel.

10. The method of eliminating or minimizing cords or striae in a stream of molten glass in a forehearth or like structure which comprises attenuating or drawing out such cords or striae by moving them mainly in the direction of and more rapidly than the normal rate of flow of the stream and then laying the attenuated or drawn-out portions of the cords or striae in the glass of the stream in directions mainly transverse to the direction of flow of the stream.

11. The method of eliminating or minimizing cords or striae in a stream of molten glass in a forehearth or like structure which comprises attenuating or drawing out such cords or striae by pulling them mainly in the direction of flow of the stream at a speed substantially greater than the flow movement of a preceding portion of the stream and further attenuating or drawing out the cords or striae thus attenuated or drawn-out by pulling them in directions extending mainly transverse to the direction of flow of the stream and laying the further attenuated or drawn-out cords or striae in long narrow loops extending transversely of the stream.

12. The method of improving the thermal condition and homogeneity of a stream of molten glass in a forehearth or like structure which comprises applying a force to glass of a portion of the stream in a zone of substantially less width than the stream tending to pull oncoming glass throughout the full width of the stream through said zone at a substantially higher speed than the rate of flow movement of the glass upstream from that acted on by said force, and shifting said zone continuously back and forth transversely of the stream to commingle thoroughly different portions of the oncoming glass throughout the full width of the stream by changing continuously the directions of movements of said portions in response to said force.

13. The method of improving the thermal condition and homogeneity of a stream of molten glass in a forehearth or like structure which comprises acting on glass of the stream at a predetermined place in such a structure to force glass of the stream throughout substantially the full width and a substantial part of the depth thereof to flow at a substantially increased velocity through a zone of substantially less width than the stream, and shifting said zone back and forth transversely of the stream to change continuously the commingling of the transversely different portions of the stream flowing to said zone.

14. The method of improving the thermal condition and homogeneity of a supply stream of molten glass in a flow channel of a forehearth or like structure comprising commingling initially transversely different portions of the glass of the stream by moving them in the glass stream transversely of the flow channel at a speed substantially greater than the rate of longitudinal flow of said stream in said channel.

15. The method of improving the thermal condition and homogeneity of a supply stream of molten glass in a flow channel of a forehearth or like structure comprising commingling initially transversely different portions of the glass of the stream by moving them in the glass stream transversely of the flow channel at a speed approximately ten times that of the rate of longitudinal flow of the glass stream in said channel.

DONALD W. MUELLER.